United States Patent [19]

Kishida

[11] Patent Number: 5,995,722
[45] Date of Patent: *Nov. 30, 1999

[54] INFORMATION PROCESSING SYSTEM

[75] Inventor: Akira Kishida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/968,793

[22] Filed: Nov. 6, 1997

Related U.S. Application Data

[63] Continuation of application No. 08/568,320, Dec. 6, 1995, abandoned.

[30] Foreign Application Priority Data

Dec. 6, 1994 [JP] Japan .................................. 6-301883
Nov. 30, 1995 [JP] Japan .................................. 7-313282

[51] Int. Cl.$^6$ ................................................ G06F 15/00
[52] U.S. Cl. ............................................. 395/114; 395/112
[58] Field of Search ................................. 395/114, 112, 395/113, 111, 117, 115, 116, 109, 110, 101, 834–839, 828, 840, 841, 882–884, 892, 893, 894, 104, 102, 107, 108; 358/468, 407, 462, 401, 442, 467; 400/63, 83; 347/142, 2, 3, 5; 710/14–19, 8, 20–21, 62–64, 72–74

[56] References Cited

U.S. PATENT DOCUMENTS

| | | | |
|---|---|---|---|
| 5,140,674 | 8/1992 | Anderson et al. | 395/111 |
| 5,220,674 | 6/1993 | Morgan et al. | 395/110 |
| 5,247,623 | 9/1993 | Sun | 395/325 |
| 5,467,434 | 11/1995 | Hower, Jr. et al. | 395/114 |
| 5,524,185 | 6/1996 | Na | 395/114 |

*Primary Examiner*—Dov Popovici
*Attorney, Agent, or Firm*—Fitzpatrick, Cella, Harper & Scinto

[57] ABSTRACT

The present invention discloses an information processing system comprising a host computer and at least two printers having different interfaces. A page description language or bit map data is received by a printer. When the page description language is received, the printer expands it into bit map data. The expanded bit map data is transferred to another printer via a parallel interface. Thus, the workload of the host computer in its printing process is lessened.

15 Claims, 14 Drawing Sheets

FIG. 1
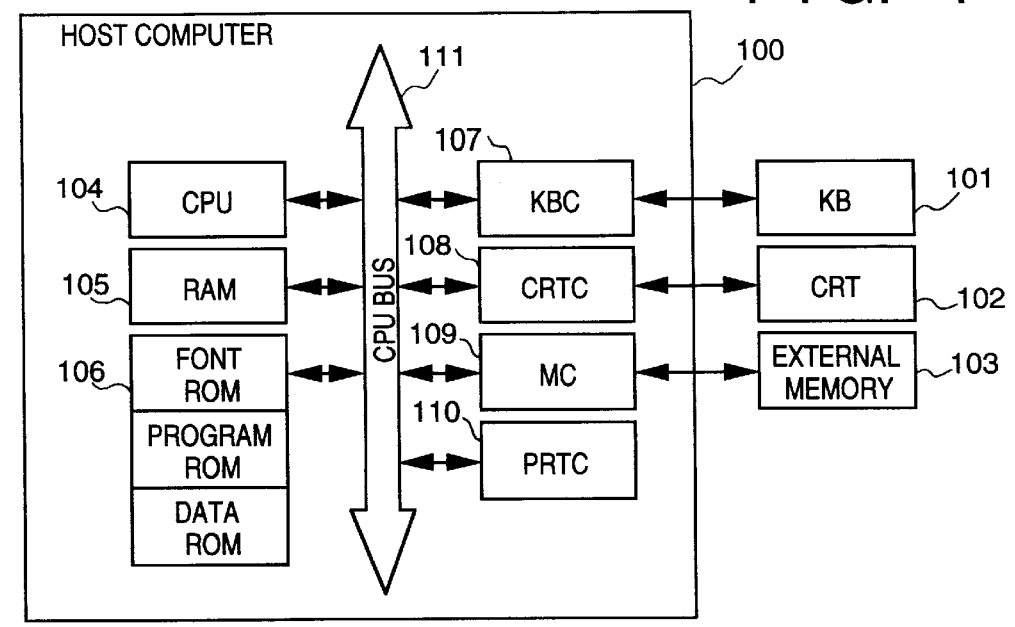
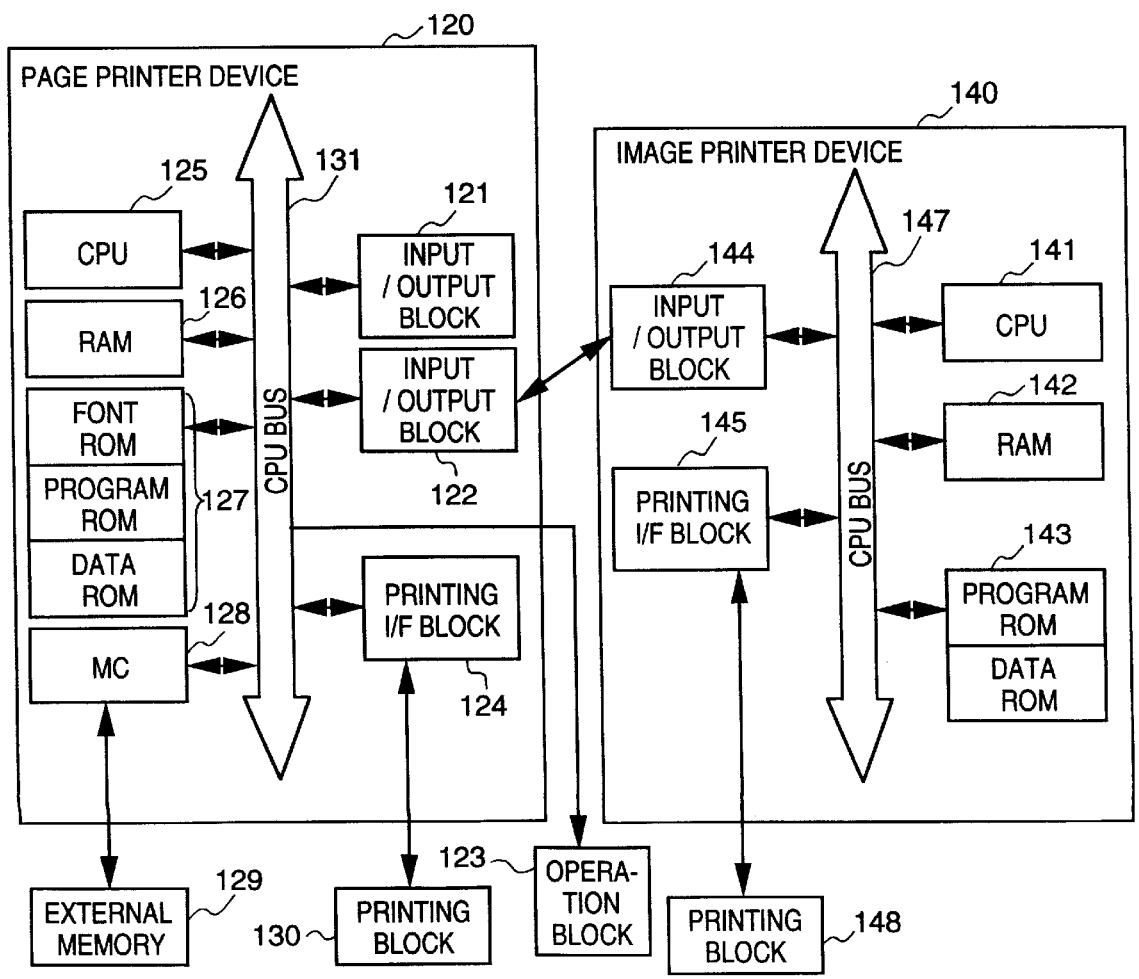

FIG. 8

| OUTPUT DATA | | | | |
|---|---|---|---|---|
| PRINTING INFORMATION DATA | | | | PRINTING DATA |
| DESTINATION DATA | DATA TYPE | | | |
| | PRINTING DATA LENGTH | TYPE OF SIGNAL | DATA CONTENT | |
| PRT-1 ▲ | TEXT LENGTH ▲ | RASTER ▲ | IMAGE DATA ▲ | |
| PRT-2 ▲ | OVERALL DATA LENGTH ▲ | PDL ▲ | COLOR DATA ▲ | |
| AUTO ▲ | | RESOLUTION ▲ | TEXT DATA ▲ | |
| | | | HIGH RESOLUTION ▲ | |

INFORMATION PROCESSING SYSTEM

This application is a continuation of application Ser. No. 08/568,320 filed Dec. 6, 1995.

BACKGROUND OF THE INVENTION

The present invention relates to an information processing system that comprises an information processing apparatus such as a personal computer, a workstation or the like, and at least two printer devices for handling printing information delivered by the information processing apparatus.

DESCRIPTION OF THE RELATED ART

Well known as printers in the prior art are image printers that print the image data received from an external instrument such as a host computer or the like, and page printers that receive print data expressed in page description language (also referred to as PDL) and expands it to a bit image to print it.

Printers that have not been available in the prior art are those that offer both the function of printing an image data as it is and the function of receiving and printing the page description language and the like. In particular, the image printer that receives and prints an image data cannot be additionally provided with the function of the page printer, and thus the image printer remains incapable of page printing.

In the printing control method employed in the prior art printers and printing systems, the image printer incorporates no page description language and the like, and thus an image data should be expanded on a host computer side and then be transferred line by line to the printer. The image printer in the prior art cannot share fonts with a printer that has a page description language and the like.

In the printing control method employed in the prior art printers and printing systems, the page printer is not provided with an interface for connection with another printer.

Since the prior art printer is limited in communications method, such as to an RS-232C serial interface, it suffers the following inconveniences.

(1) When the printer receives information from an external apparatus such as a host computer, the communication with the host computer is performed in such a limited way as an RS-232C serial interface. Thus, the prior art printer is not compatible with any system that works on a parallel interface such as Centronics parallel interface that is widely used for communications between printers and host computers.

(2) If an information system operates with a page printer having a page description language and the like and an image printer, both types of printers have to be separately connected to the information system.

Furthermore, in the printing control method employed in the prior art printer or printing system, the image printer has no PDL. The host computer must rasterise its output data into image data, and transmit it to the image printer on a line-by-line basis. For this reason, the host computer is provided rasterising capability. In particular, the image printer that receives color image data and prints a color image has room for improvement in terms of process speed and the workload that is shouldered by the host computer, because the host computer is forced to rasterise a vast amount of color output data.

There have not existed prior art printers that are selectively switched, according to the type of an input to them, between the function of providing an economical color printing an image printer offers and the function of providing a high resolution printing by means of PDL in the way a page printer works.

Furthermore, when the prior art printer suffers any fault in its printing block, such as paper jamming or running out of toner, it must be re-started and data that was suspended in the middle of transmission must be retransmitted.

SUMMARY OF THE INVENTION

The present invention has been developed to solve the above problems, and it is an object of the present invention to provide an information processing system that reduces printing workload in its information processing apparatus.

It is another object of the present invention to provide a printer that has the function of expanding into an image data the printing data received in page description language from the information processing apparatus and outputting the image data.

To achieve the above objects, the information processing system of the present invention is organized as follows.

The information processing system, constructed of an information processing apparatus and at least two printer devices having different interfaces, comprises:

receiving means for receiving printing information through a first interface, expander means for expanding into an image data the printing information received from the receiving means, and transmitting means for transmitting through a second interface the image data expanded by the expander means.

In the above arrangement, the printing information is received through the first interface, the printing information is expanded into the image data, and the expanded image data is transmitted through the second interface.

Other objects of the present invention will become apparent from the drawings and description that follows.

BRIEF DESCRIPTION OF THE DRAWINGS

FIG. 1 is a block diagram showing the construction of a printer system of an embodiment 1 of the present invention.

FIG. 8 is a block diagram showing the output data structure of the embodiment 4 of the present invention.

DETAILED DESCRIPTION OF THE PREFERRED EMBODIMENTS

Embodiment 1

Figure 2:
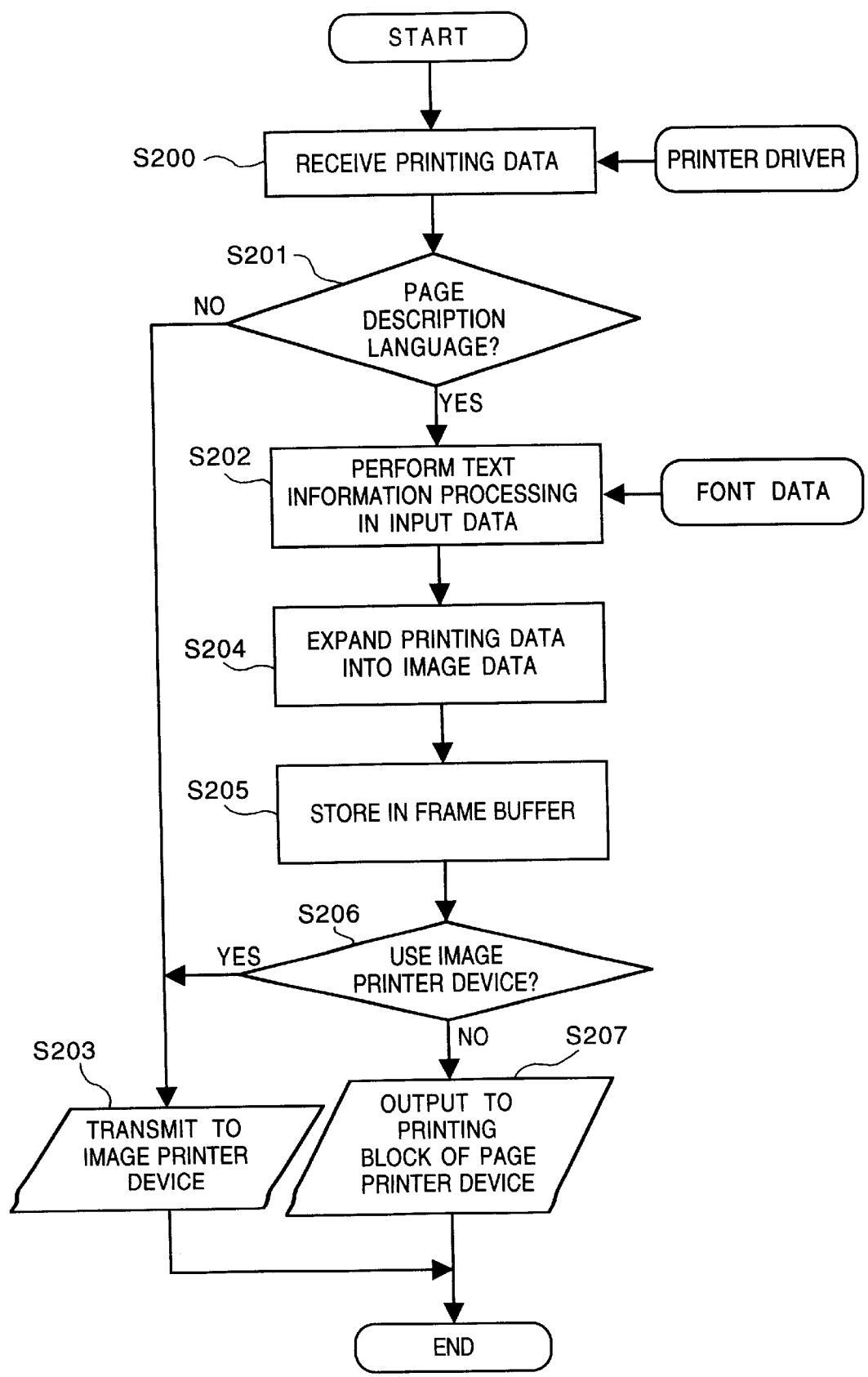
FIG. 2 is a flow diagram showing the printing process of the embodiment 1.

Referring now to the drawings, preferred embodiments of the present invention are discussed.

FIG. 1 is the block diagram showing the printer system of the embodiment 1, which comprises a host computer 1, a page printer device 120, and an image printer device 140.

A host computer 100 in FIG. 1 comprises CPU 104 for processing, according to a document processing program, a document containing a mixture of drawings, images, characters, tables and the like, RAM 105 as the main memory for the host computer 100 for serving as the working area for the CPU 104, ROMs 106 for storing the program for the CPU 104, a keyboard controller (KBC) 107 for controlling inputs from the keyboard (KB) 101 or an unshown pointing device, a CRT controller (CRTC) 108 for controlling the display of a CRT display (CRT) 102, a memory controller (MC) 109 for controlling access to an external memory 103 such as a hard disk (HD) or a floppy disk (FD) that stores a boot program, a variety of applications, font data, user files, edit files and the like, and a printer controller (PRTC) 110 for controlling communications via a predetermined bidirectional interface (I/F) with a page printer device to be described later.

The CPU 104 controls generally a plurality of devices that are coupled to a CPU bus 111, while feeding printing data to the page printer device to be described later. In addition to a program ROM, the ROMs 106 comprise a font ROM for storing font data for use in document processing, and a data ROM for storing a diversity of data used in document processing.

The page printer device 120 comprises an input/output block 121 for controlling communications with the host computer 100 through a bidirectional interface, an input/output block 122 for controlling data exchange with an image printer to be described later, an operation block 123 constructed of a plurality of key input sections and a display, a printing interface (I/F) block 124 for outputting printing data to a printing block 130 that prints an image on a recording medium by means of a laser beam, a CPU 125 for controlling generally the page printer device according to a control program or control data to be described later, a RAM 126 that defines an image memory and the working area that is used by the CPU 125 when it executes its processing, a ROM 127 for storing the control program of the CPU 125, font data and a diversity of data, and a memory controller (MC) 128 for controlling access to an external memory 129.

The image printer device 140 comprises a CPU 141 for performing controlling according to a control program and control data, a RAM 142 that serves as a working area used by the CPU 141 when it executes its processing, a ROM 143 for storing the control program of the CPU 141 and control data, an input/output block 144 for controlling data exchange with the page printer device 120, and a printing I/F block 145 for outputting printing data to a printing block 148 which prints an image data onto a recording medium by means of a laser beam.

FIG. 2 is the flow diagram of the printing process of the page printer device 120 of the embodiment 1. The program for this processing is stored in the ROM 127 and executed under the control of the CPU 125.

In the initialization process at power-up of the system, a determination is made of whether the image printer device 140 is connected to the page printer device 120. When both are connected, information about the type of the image printer and the type of its control code processing program is transferred to the host computer 100 via the bidirectional interface.

Next, when the printing data is received from the host computer 100 via the printer driver of the PRTC 110 at step S200, the process goes to step S201 where a determination is made of whether the printing data is either the image data for the image printer device 140 or a page description language. If it is the image data, the process goes to step S203, where the image data is transferred to the image printer device 140 via the input/output blocks 122, 144.

If the printing data is the page description language at step S201 on the other hand, the process goes to step S202, where text information processing of the page description language is performed referring to the font ROM 106 or the like. The process goes step S204, where the printing data is expanded to an image data. At step S205, the expanded data is stored in a frame buffer. At step S206, referring to printing status, a determination is made of whether to output the image data to the printing block 130 for printing or to transfer the image data to the image printer device 140 via the input/output blocks 122, 144. Specifically, when the printing block 130 of the page printer device 120 is now printing, the process goes to step S203, where the image data is transferred to the printing block 148 of the image printer device 140. On the other hand, when the page printer device 120 is ready for printing, the process goes to step S207, where the image data is transferred to the printing block 130 via the printing I/F block 124. Other status may be factored into the determination at step S206. For example, the status of the image printer 140 or the destination of the output specified by the host computer 100 may be considered in the determination at step S206.

The embodiment 1 of the present invention offers the function in which the page printer device expands to the image data the printing data in the page description language received from the host computer and outputs the image data to the image printer device. Thus, the workload of the host computer is reduced.

Embodiment 2

Referring to drawings, the embodiment 2 of the present invention is now discussed.

Figure 3:
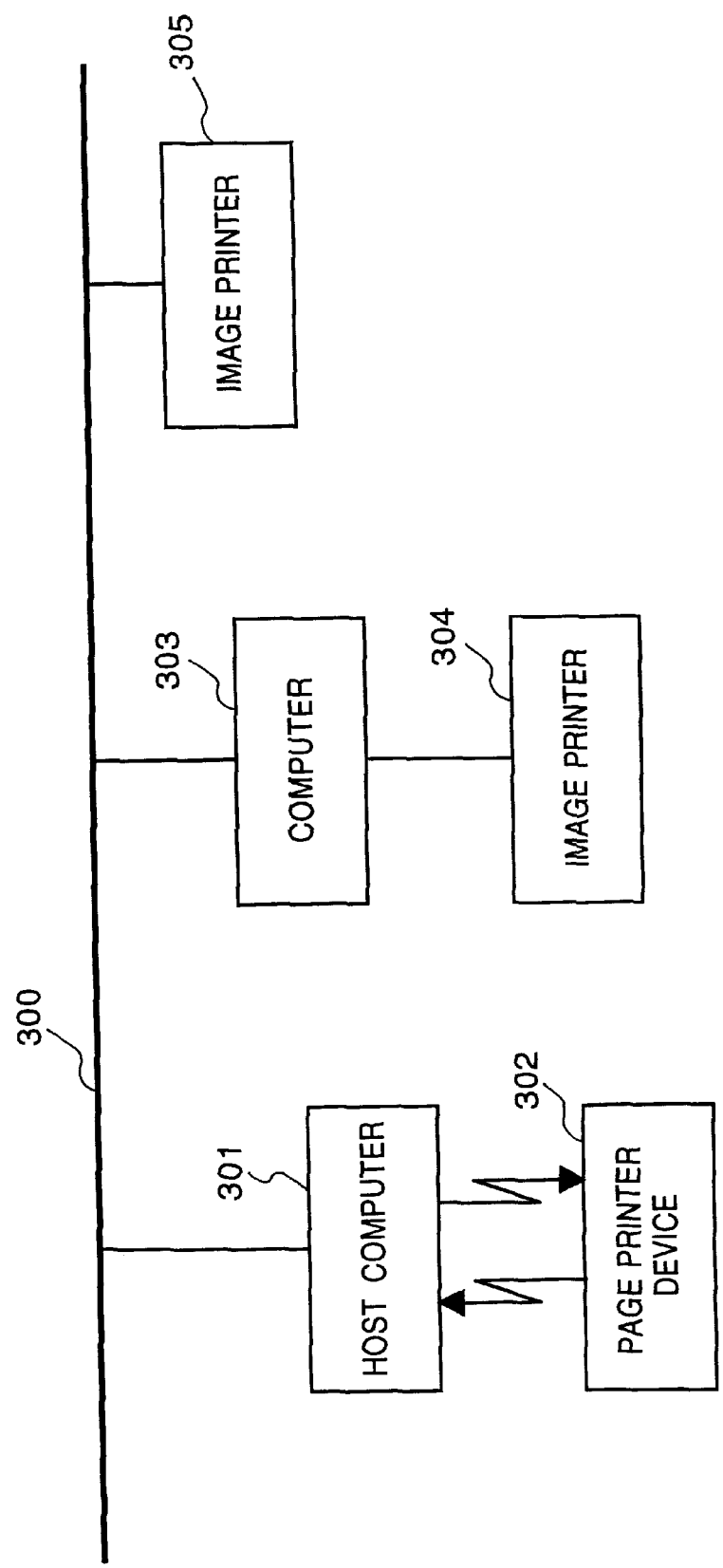
FIG. 3 is a block diagram showing the construction of an embodiment 2 of the present invention.

FIG. 3 is the block diagram showing the construction of the printer system of the embodiment 2. Connected to a network 300 in the embodiment 2 are a host computer 301, a computer 303, and an image printer device 305 for the network. A page printer device 302 is connected to the host computer 301 via a bidirectional interface. An image printer device 304 is connected to the computer 303.

The host computer 301, page printer device 302 and image printer device 304 in the embodiment 2 remains unchanged in their construction from those already described with reference to the embodiment 1.

Figure 4:
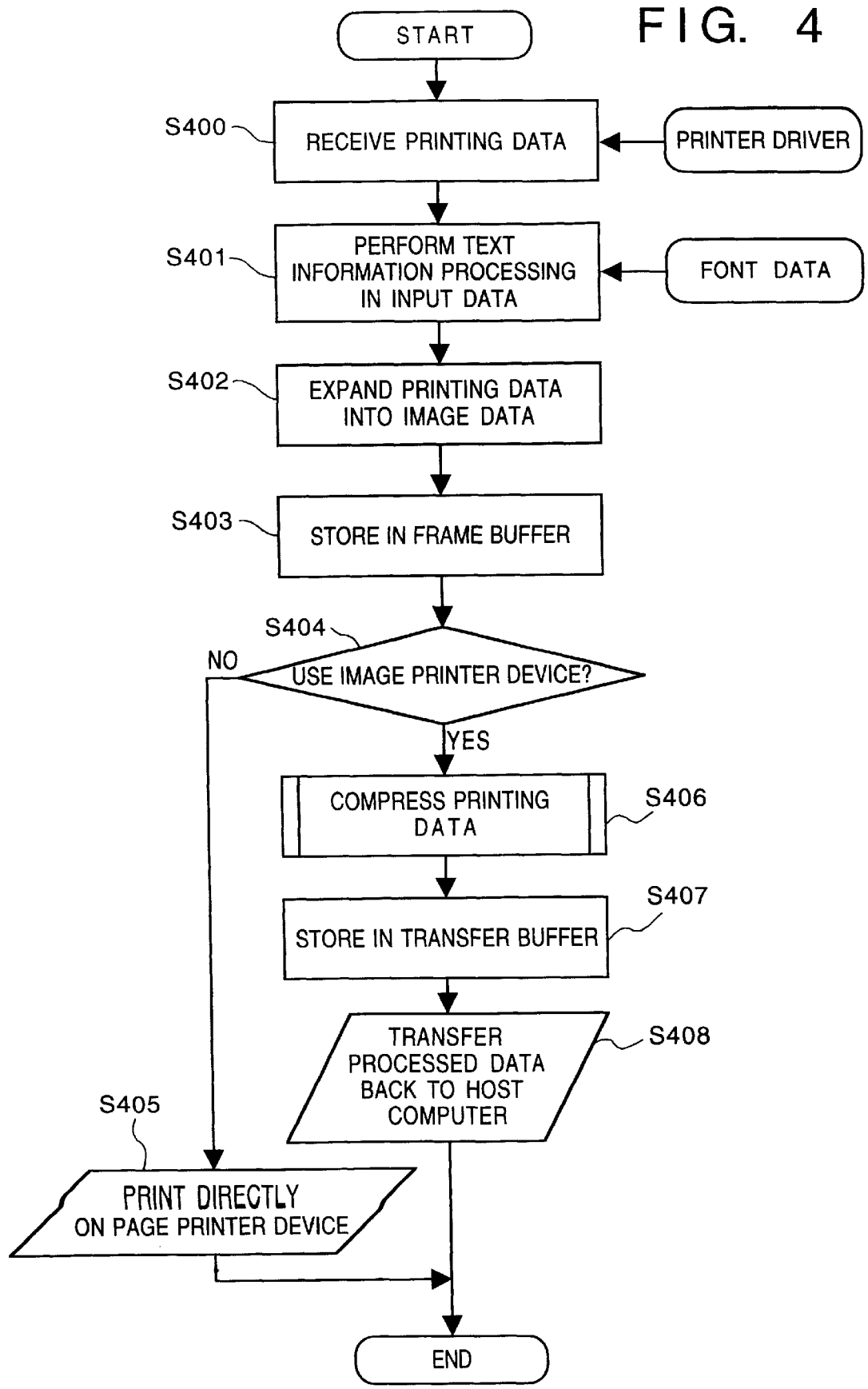
FIG. 4 is a flow diagram showing the printing process of the embodiment 2.

FIG. 4 shows the flow diagram showing the printing process of the page printer device 302 of the embodiment 2. The program of process steps is stored in the ROM and is executed under the control of the CPU.

When the page printer device 302 receives the printing data at step S400, the process goes to step S401, where text information processing is performed referring to the font ROM and the like. The process goes to step S402, where the printing data is expanded to an image data. At step S403, the expanded image data is stored onto a frame buffer.

Next, at step S404, a determination is made of whether the destination of the image data is the image printer device 305 existing on the network 300 or the image printer device 304 connected to the computer 303. When the destination is neither of both image printer devices, the process goes to step S405, where the image data is directly printed on the page printer device. When the destination is either the image printer device 304 or image printer device 305, the process goes to step S406, where the image data that is expanded at step S402 is compressed using a known image compression technique. At step S407, the compressed image data is stored in a transfer buffer. At step S408, the compressed image data is transferred to the host computer 301 via a bidirectional interface.

The host computer 301 transmits the image data, into which the page printer device 302 has converted the printing data, via the network to either the network image printer device 305 or the image printer device 304 connected to the computer 303 on the network.

According to the embodiment 2, the printing process is performed by the page printer rather than by the host computer. Thus, the workload of the host computer is reduced.

Embodiment 3

Referring to drawings, the embodiment 3 of the present invention is now discussed.

Figure 5:
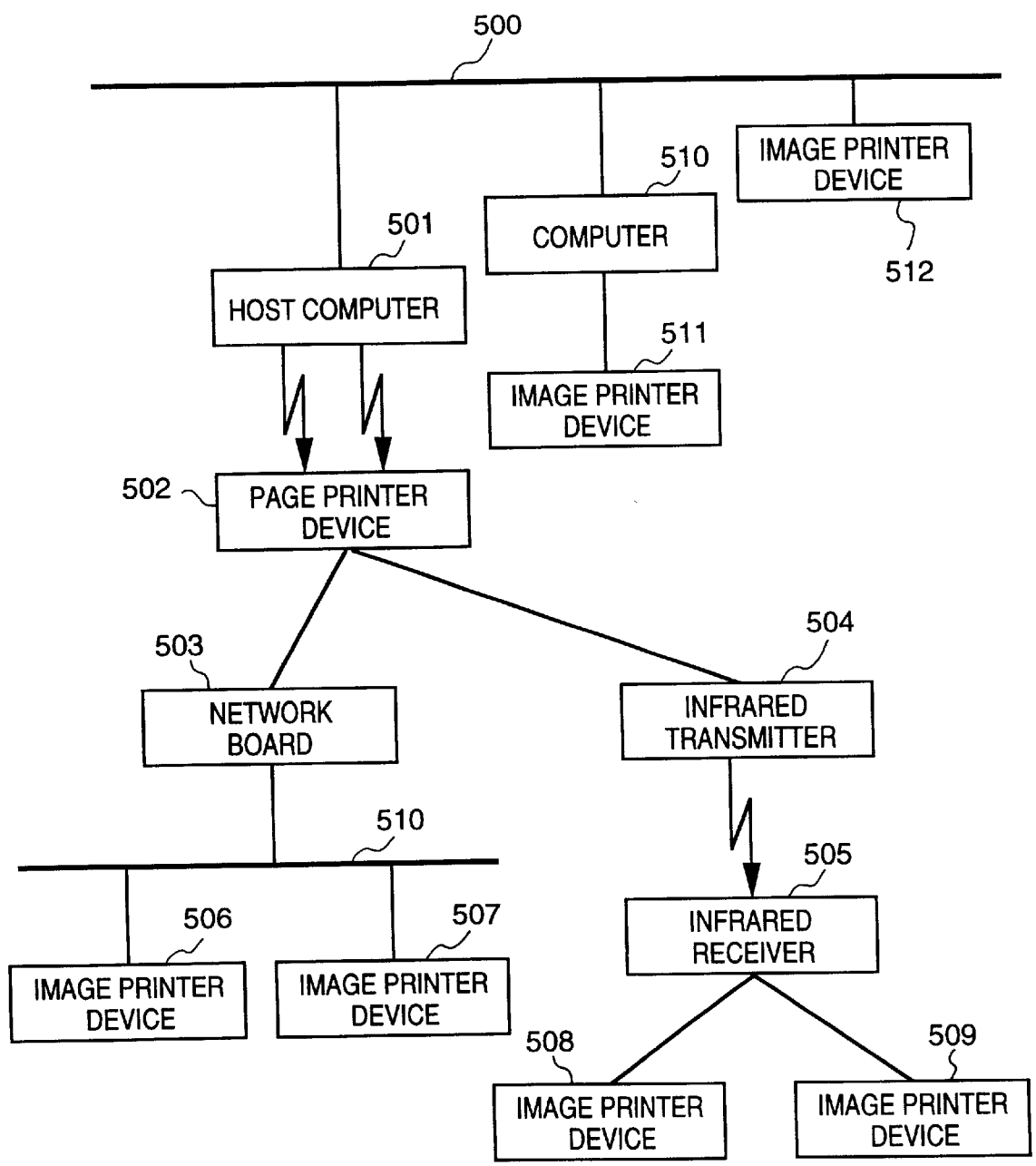
FIG. 5 is a block diagram showing the construction of an embodiment 3 of the present invention.

FIG. 5 is the block diagram showing the construction of the printer system of the embodiment 3. In the embodiment 3, a page printer device 502 is connected via a bidirectional interface to a host computer 501 on a network 500. An infrared transmitter 504 is connected to the page printer device 502. An infrared receiver 505 connects to a plurality of image printers 508, 509. The page printer 502 connects to a network board 503, and its network 510 connects to a plurality of image printers 506, 507.

The host computer 501, page printer 502 and each of the image printers in the embodiment 3 remain unchanged in their construction to those described with reference to the preceding embodiments, and their explanation will not be repeated.

Figure 6:
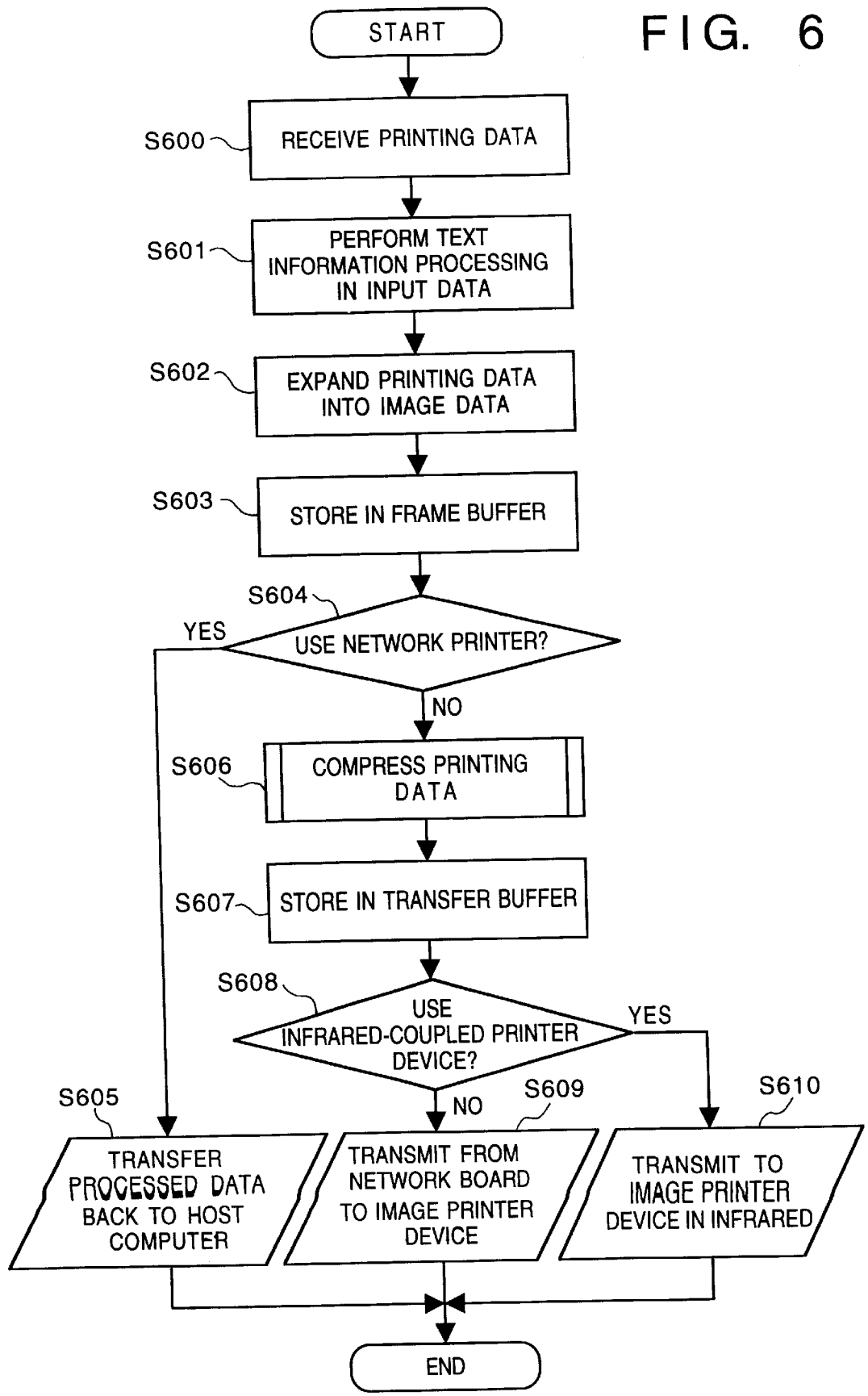
FIG. 6 is a flow diagram showing the printing process of the embodiment 3.

FIG. 6 is the flow diagram of the page printer device 502 of the embodiment 3.

In the initialization process at power-up of the system, the page printer device 502 transfers to the host computer 501 the information indicative of how the image printer devices 506, 507 and the like are connected to the network board 503 connected to the page printer device 502. When printing data is received from the host computer 501 at step S600, the process goes to step S601, where text information processing is performed referring to the font ROM. At step S602, the printing data is expanded to an image data. At step S603, the expanded image data is stored in the frame buffer.

At step S604, a determination is made of whether the printer device that is now going to print is the image printer devices 511, 512 under the control of the host computer 501. When printing is performed by the image printer devices on the network 500, the process goes to step S605, where processed data is fed back to the host computer 501. The host computer 501 transmits the data to the image printer devices 511, 512.

On the other hand, when the determination at step S604 reveals that the printer devices under the control of the host computer 501 are not used, the process goes to step S606, where printing data is compressed using a known compression technique. At step S607, the compressed image data is stored in a transfer buffer. At step S608, a determination is made of whether to use the image printer devices 506, 507 that are connected to the network 510 via the network board 503, or to use the infrared-coupled image printer devices 508, 509. When the image printer devices 506, 507 on the network 510 are used, the process goes to step S609, where the image data is transferred via the network board 503 to the image printer devices 506, 507 for printing. When the infrared-coupled image printers 508, 509 are used, the process goes to step S610, where the infrared transmitter 504 transmits the image data. The image printer devices 508, 509 print out the image data received by the infrared receiver 505.

According to the embodiment 3, the page printer is provided with a networking function. Thus, the processed image data is directly transferred to the image printer devices, and the printing process that would be otherwise performed by the host computer is accomplished by the page printer device.

The present invention may be implemented in a multi-device system as well as a single-device system. The present invention may be implemented by loading a software program to a multi-device system or a single-device system.

As described above, the above embodiments provide the printing method and device of the information processing system with reduced workload in printing process of the information processing apparatus.

Embodiment 4

Figure 7:
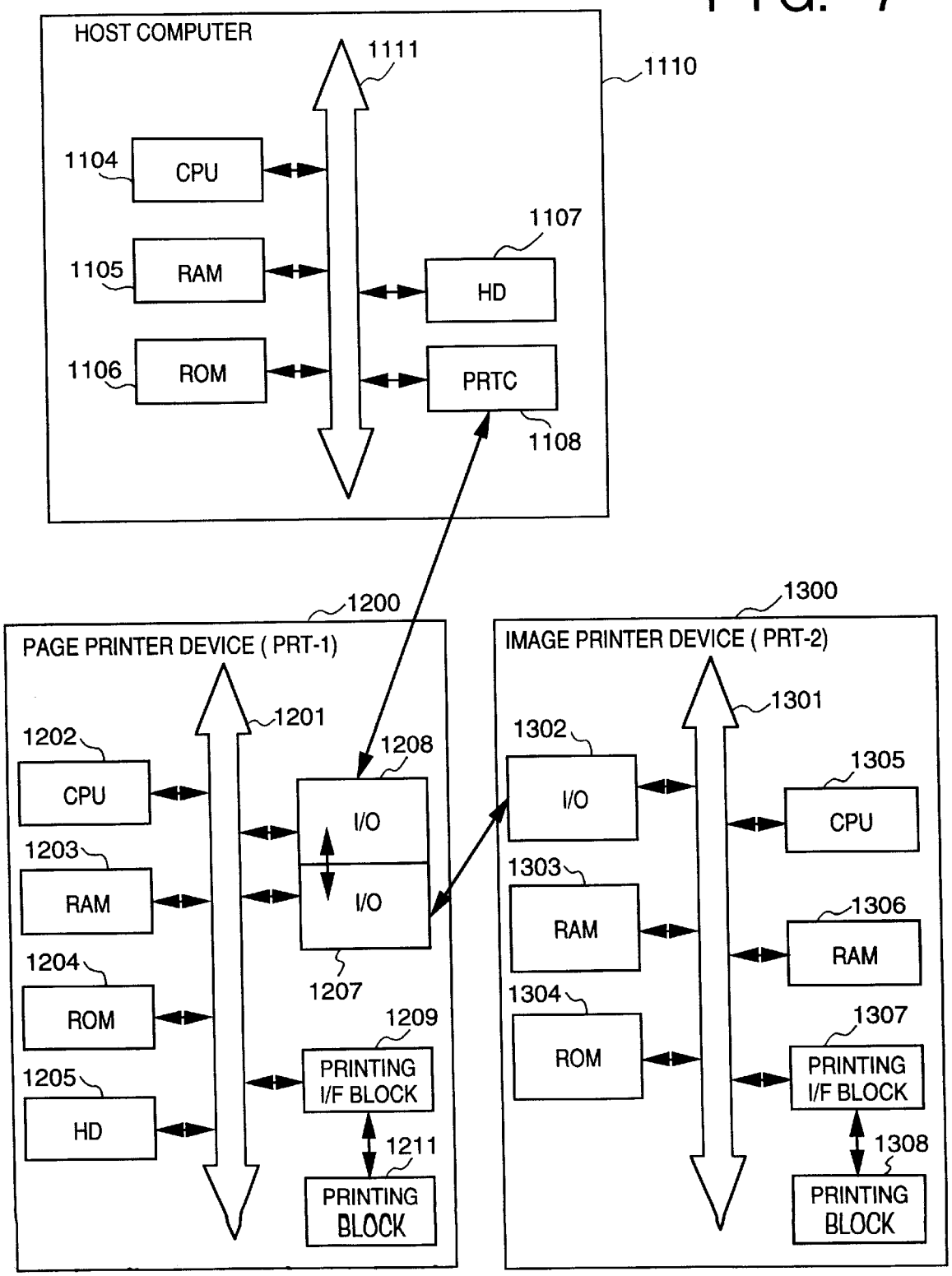
FIG. 7 is a block diagram showing generally the construction of a printer system of an embodiment 4 of the present invention.

FIG. 7 is the block diagram showing a host computer 1100 and the printer system of the embodiment 4 comprising a page printer device 1200 and an image printer device 1300.

In FIG. 7, the host computer 1100 transmits its output data to the page printer device 1200 of this embodiment. Input/output or interface blocks 1108, 1206 control data transfer between the page printer 1200 and the host computer 1100. The CPU 1202 in the page printer device 1200 performs a diversity of control according to the control program stored in ROM 1204 and control data, and controls generally the page printer device 1200. Unless otherwise particularly noted in the description that follows, the host computer is controlled by CPU 1104, the page printer device 1200 by CPU 1202, and the image printer device 1300 by CPU 1305. RAM 1203 has memory areas assigned as a receive buffer for receiving data and a page memory area for rasterising output data. The RAM 1203 also stores data handled in the course of performing a diversity of printing control. Designated 1211 is a printing block which outputs printing data stored in the RAM 1203. Input/output blocks or interface blocks 1207, 1302 control data transfer between the page printer device 1200 and the image printer device 1300. The image printer device 1300 receives at its interface block 1302 the output data from the page printer device 1200.

FIG. 8 shows the output data structure according to the embodiment 4. As shown, the output data contains printing data and printing information data on its header portion. The printing information data contains the destination about a target printer and the data type of the printing data. The destination provides the name of the printer an application specifies or the indication of printer automatic selection mode (hereinafter referred to as AUTO).

The data type provides the description regarding printing data length, the type of printer control signal, and data content. The printing data length specifies the overall printing data length and the length of text data if included therein.

As the output data, the printing data associated with the printing information is transferred to the printer device 1200. The table below shows an example of the content of the printing information data.

Example of printing information data

| Example | Destination data | Printing data length | Printing signal | Data content |
|---|---|---|---|---|
| Printing a color image by image driver | PRT-2 | Overall: xxxx Text:0 | PDL (color) 360 dpi | Image data Color data |
| Printing color text in AUTO mode | AUTO | Overall: xxxx Text:xxxx | PDL (color) 600 dpi | Text, Text data High resolution |

Figure 9:
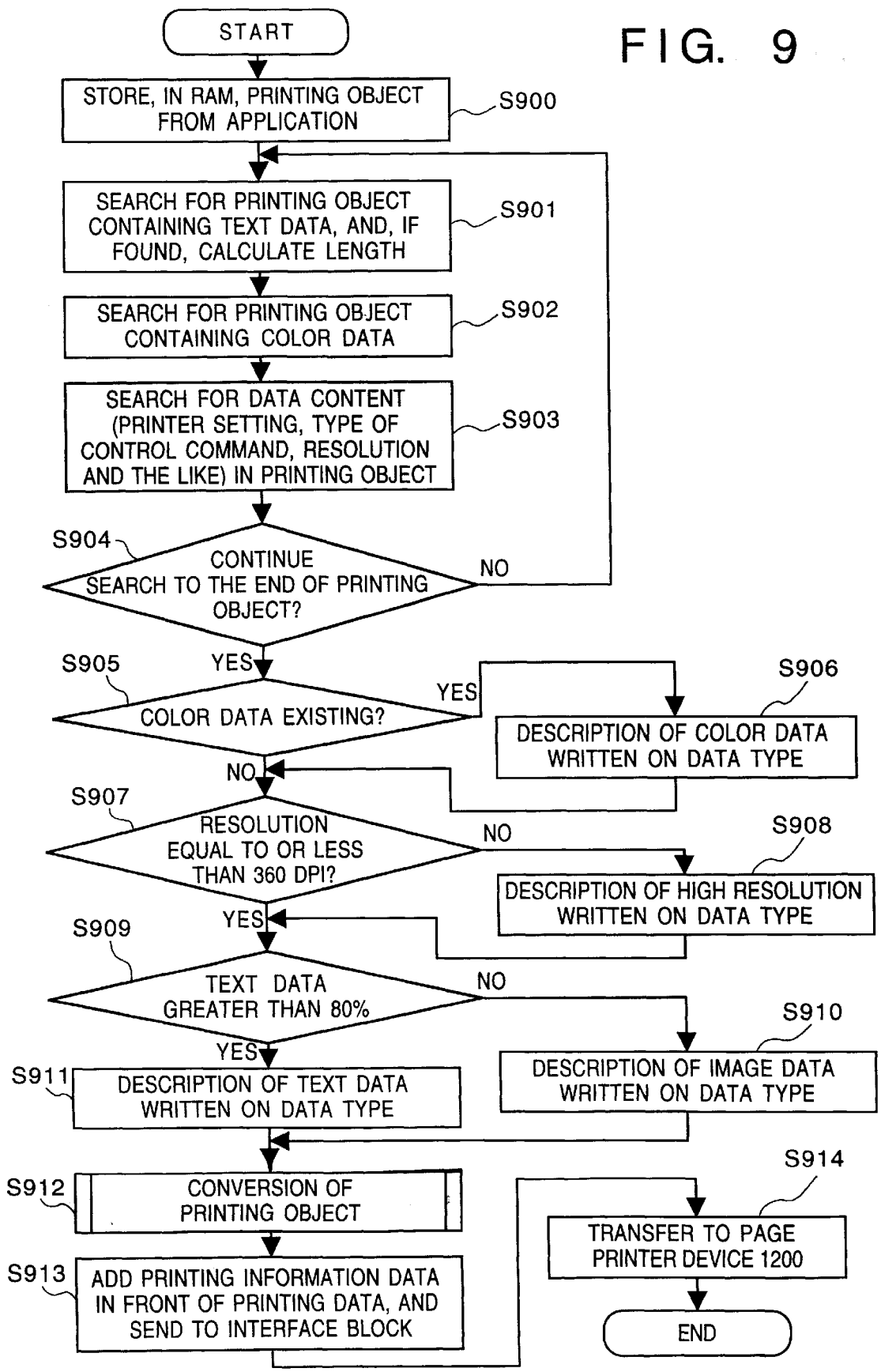
FIG. 9 is a flow diagram showing the output data forming process of the printer driver of the embodiment 4 of the present invention.

FIG. 9 shows the output data forming flow diagram of the printer driver software (hereinafter referred to as printer driver) in the host computer 1100. The printer driver is loaded from HD 1107 to RAM 1105 in the host computer. It should be noted that each step in the following process is performed according to the printer driver unless otherwise particular stated. At step S900, the printing object given by an application is stored in the receive buffer of the RAM 1105. At step S901, to form printing information data, the printing object is checked to see if it contains text data. If the printing object contains text data, the number of bytes of the text data is added to the text data length. At step S902, the printing object is searched to see if it contains color data. At step S903, the content of the printing object is checked. The content includes the destination data, type of signal data, resolution data and the like. The printing object normally includes these data, and thus they are directly arranged in each respective part of the data type. Among them, the resolution data is arranged in the type of signal area as a resolution value. At step S904, a check is made of whether or not a series of steps S901 through S903 are completed, by recognizing the end of the printing object.

If the printing object contains at least one color data, a description of the color data is provided in the data content of the data type at step S906. The resolution value in the type of signal of the data type that is derived from the printing object at step S903 is compared with 360 dpi at step S907. If it is greater than 360 dpi, the description of high resolution is included in the data content of the data type at step S908. At step S909, whether or not the ratio of the text data length to the overall data length in the output data is greater than 80% is calculated. If the text data is smaller than 80%, the description of image data is included in the data content of the data type at step S910. If the text data is 80% or greater, the description of the text data is included in the data content of the data type at step S911. At step S912, all the printing object stored in the RAM 1105 is converted to PDL. At step S913, the printing information data is arranged ahead of the printing data in the output data, which is then transferred to the interface block 1108. At step S914, the output data is transmitted to the page printer device 1200 via a Centronics parallel interface line.

Figure 10:
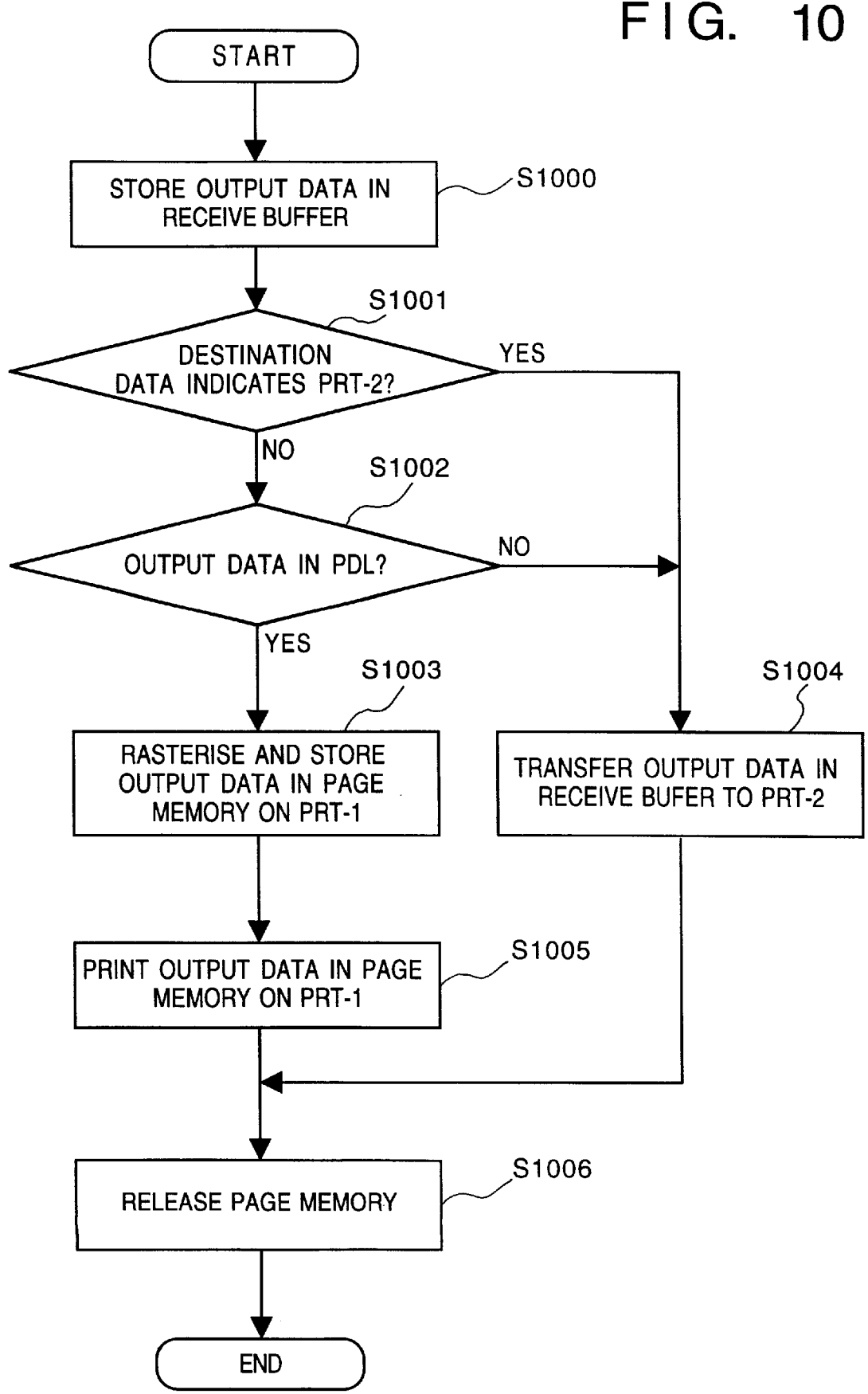
FIG. 10 is a flow diagram showing the printing process of the page printer according to the embodiment 4 of the present invention.

FIG. 10 is the flow diagram showing the printing process of the page printer device 1200 (hereinafter referred to as PRT-1) of this embodiment. The program for this process is stored in ROM 1204, and is executed under the control of CPU 1202. The printer system further comprises as a terminal printer the image printer device (hereinafter referred to as PRT-2) connected to PRT-1.

At step S1000, the printing process starts with receiving at the receive buffer assigned in RAM 1203 the output data processed by the printer driver in RAM 1105 of the host computer 1100. At step S1001, a determination is made of whether or not the destination data in the printing information data at the header portion of the output data is PRT-2. If the destination data is PRT-2, the output data in the receive buffer assigned in RAM 1203 is transferred to PRT-2 via the interface blocks 1207, 1302 at step S1004. If the destination data is not PRT-2, the type of signal of the data type is checked to see if the output data is described in PDL at step S1002. If it is not described in PDL, the process goes to step S1004, where the output data on the receive buffer assigned in RAM 1203 is transferred to PRT-2. If it is described in PDL, on the other hand, the output data is rasterised and stored on the page memory area assigned in RAM 1203 in PRT-1 at step S1003. At step S1005, the output data rasterised is printed on PRT-1. At step S1006, the page memory area assigned in RAM 1203 is released.

Embodiment 5

Figure 11:
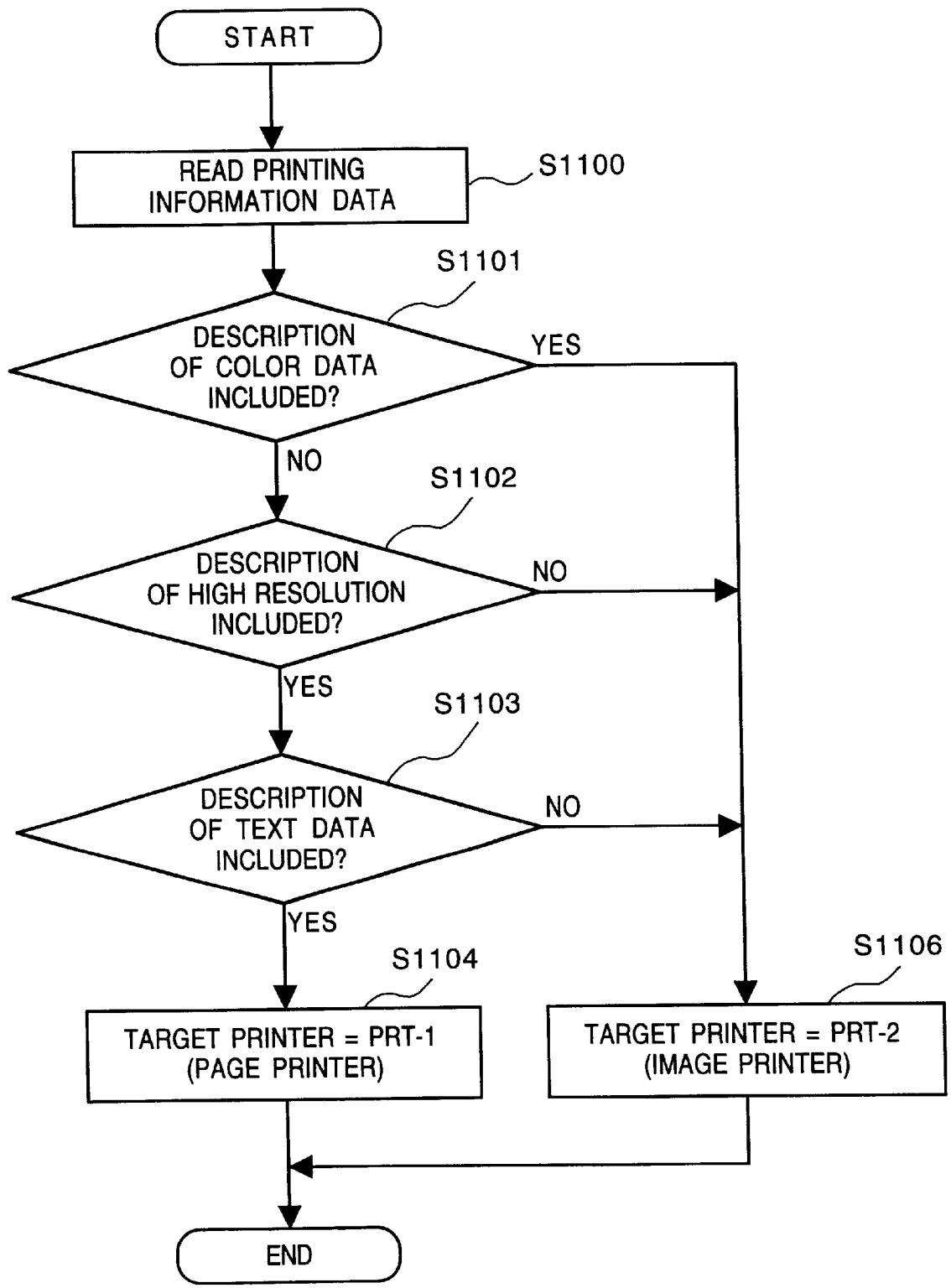
FIG. 11 is a flow diagram showing the output data checking process of the page printer according to an embodiment 5 of the present invention.

The embodiment 5 of the present invention is now discussed. The construction of the printer system of this embodiment remains unchanged from that in FIG. 7. The output data in printing is formed in the same manner as in the output data forming process employed in the embodiment 4. It should be noted that each step of the following process is executed by CPU 1202 according to the control program stored in ROM 1204 unless otherwise particularly stated. In FIG. 7, the image printer device 1300 (hereinafter PRT-2) is limited to a color image printer. The flow diagram in FIG. 11 is the one for output data checking process, and is integrated into the flow diagram in FIG. 12. FIG. 11 is a detailed flow diagram of step S1206 in FIG. 12 for output data checking process.

As shown in FIG. 11, of the output data rasterised to the page memory area in RAM 1203 in PRT-1, the printing information data is expanded to RAM 1203. At step S1101, a determination is made of whether the description of color data is included in the data content of the data type in the output data. If there exists the description of color data, the target printer is set to be PRT-2 at step S1106. If no description of color data is found, a determination is made of whether the description of high resolution is included in the data content of the data type in the output data at step S1102. With no description of high resolution, the target printer is set to be PRT-2 at step S1106. If there is the description of high resolution, a determination is made of whether the description of text data is included in the data content of the data type at step S1103. If there is the description of text data, the target printer is set be PRT-1 at step S1104. With no description of text data, the target printer is set to be PRT-2.

Figure 12:
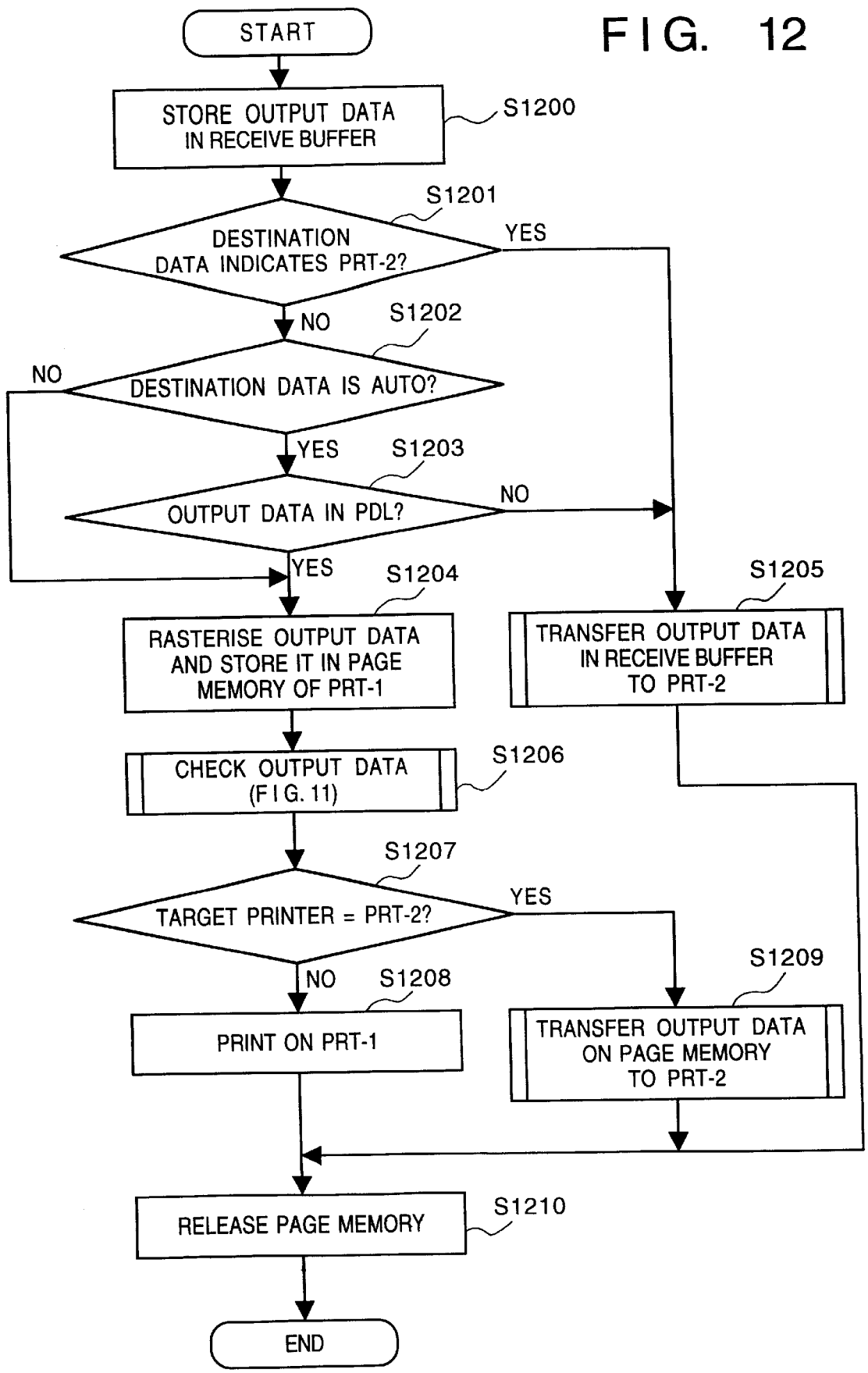
FIG. 12 is a flow diagram of the printing process of the page printer according to the embodiment 5 of the present invention.

Referring to FIG. 12, the main process of this embodiment is now discussed. The process starts with receiving the output data at the receive buffer assigned in RAM 1203 at step S1200 as shown in FIG. 12. A determination is made of whether or not the destination data of the printing information data is PRT-2 at step S1201. If it is PRT-2, the output data on the receive buffer assigned in RAM 1302 is transferred to PRT-2 at step S1205. On the other hand, if it is not PRT-2, a determination is made of whether or not the destination data is AUTO at step S1202. If the destination data is AUTO, the type of signal of the data type is checked to see if the output data is described in PDL at step S1203. If it is not described in PDL, the output data in the receive buffer assigned in RAM 1203 is transferred to PRT-2 at step S1205. If the destination data is not AUTO at step S1202 and if the output data is described in PDL at step S1203, the output data is rasterised in PRT-1 at step S1204, and then stored in the page memory area assigned in RAM 1203. The output data is then checked as described with reference to FIG. 11. At step S1207, a determination is made of whether or not the target printer is PRT-2. If it is PRT-2, the output data rasterised and stored on the page memory area assigned to RAM 1203 is transferred to PRT-2 at step 1209. If it is not PRT-2, printing operation is performed on PRT-1 at step S1208. In both cases, the final step is to release the page memory area at step S1210.

Embodiment 6

The embodiment 6 of the present invention is now discussed. The construction of the printer system of this embodiment remains unchanged from that in FIG. 7. Each step in the following process is executed by CPU 1202 according to the control program stored in ROM 1204, basically in the same way as the embodiment 5. The difference is that step S1208 in the embodiment 5 in FIG. 12 for printing step on PRT-1 is replaced with print stop step in the event of printing malfunction. The embodiment 6 is now detailed.

The process is performed in PRT-1 as shown in FIG. 12. When the process goes to step S1208, the process of the embodiment 6 starts. A determination is made of whether any mechanical error such as paper jamming, running out of toner or paper or the like takes place in the printing block 1211 in PRT-1. If no such error is detected, the normal printing operation identical to step S1208 in FIG. 12 is performed. If any error is detected, a determination is made of whether or not the output data rasterised remains in its complete form on the page memory area assigned in RAM 1203. If it remains, the output data rasterised onto the page memory area is transferred to PRT-2. If no data remains, an error message is transmitted to the display panel of the page printer device PRT-1 at step S1209.

Finally, the process of the embodiment 6 returns to step S1210 of FIG. 12 of the embodiment 5, and the page memory area is released.

Embodiment 7

The embodiment 7 of the present invention is now discussed. The construction of the printer system remains unchanged from that in FIG. 7. The program for the process of this embodiment is stored in ROM 1204 and executed by CPU 1202 in the page printer device 1200, PRT-1. When the page memory area assigned in RAM 1203 in PRT-1 is in use for printing process, controlling is performed with the page memory area use flag of RAM 1203.

Figure 13:
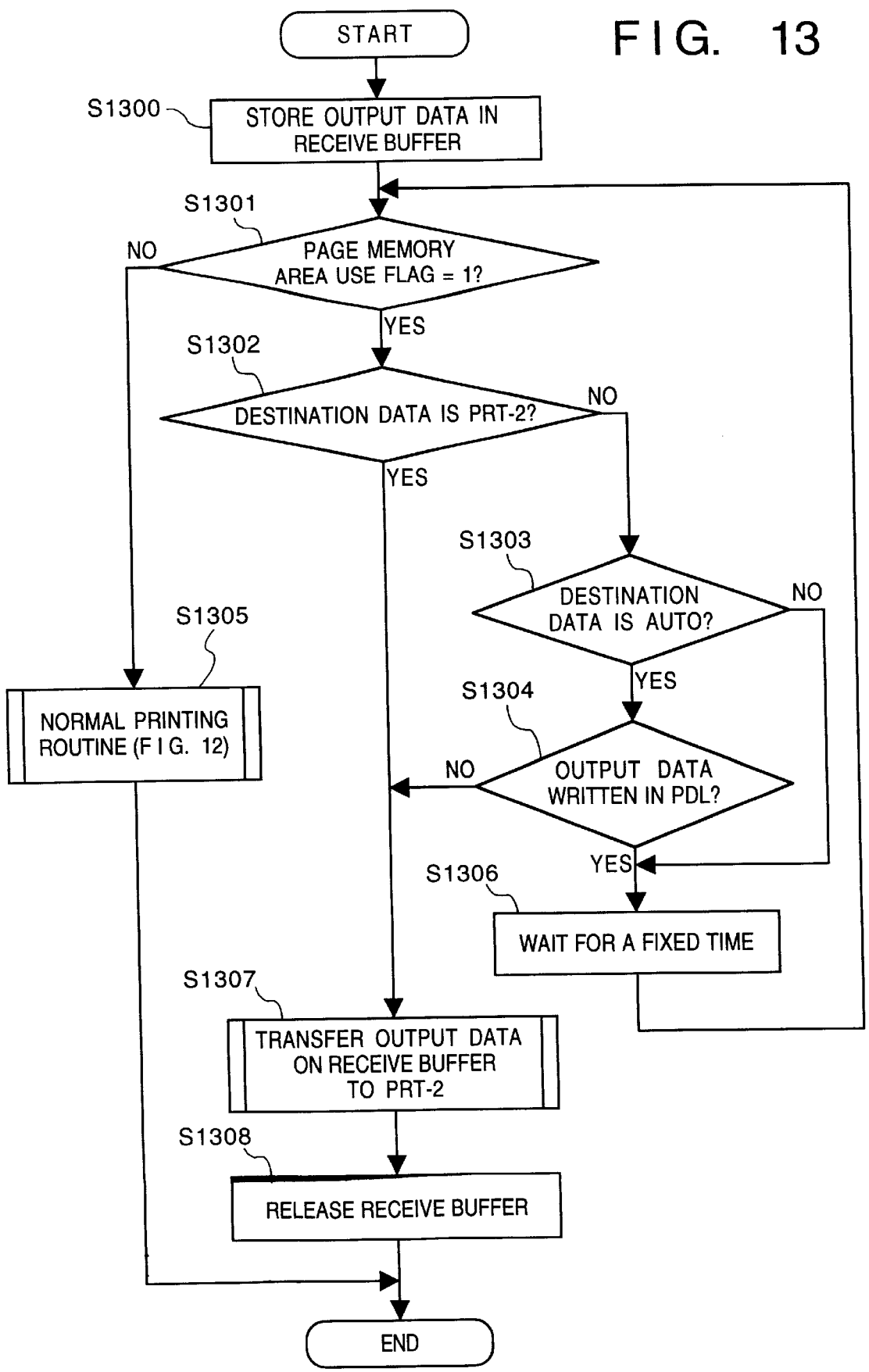
FIG. 13 is a flow diagram showing the printing process of the page printer according to a seventh embodiment of the present invention, wherein the destination of the output data is selectively switched.

First, the output data is received by the receive buffer assigned in RAM 1203 at step S1300 as shown in FIG. 13. At step S1301, the page memory area use flag of RAM 1203 is checked. When it is not set, PRT-1 is not printing, and at step S1305, a normal printing routine is performed at step S1305 as the embodiment 5 in FIG. 12. When the flag is set, PRT-1 is now printing, and at step S1302, a determination is made of whether the destination data of the printing information data is PRT-2. If it is PRT-2, the output data on the receive buffer assigned in RAM 1203 is transferred to PRT-2 at step S1307.

If the destination data is found to be not PRT-2 at step S1302, a determination is made of whether or not the destination data of the output data is AUTO at step S1303. If it is AUTO, the type of signal of the data type is checked to see if the output data is described in PDL at step S1304. If it is not described in PDL, the output data on the receive buffer assigned in RAM 1203 is transferred to PRT-2 at step S1307.

If the destination data is not AUTO at step S1303 and if the output data is described in PDL at step S1304, the process stays in waiting status for a fixed period of time (2 ms in this embodiment), and then returns to step S1301.

The output data on the receive buffer is transferred to PRT-2 at step S1307, and then the page memory area is released at step S1309.

According to embodiments 4 through 7, the function of checking the printing data specification is incorporated in the system that is made up of the page printer and the image printer, both of which are conventionally separately connected. To print the printing data, the system therefore automatically selects the printer that matches the printing data specification. In particular, when the color image printer is used, the system allows its page printer to rasterise the color output data, even if it is described in PDL (page description language), as long as the page printer is equipped with color compatible PDL, and the color image printer prints a color image. This arrangement thus permits fast printing in a manner that imposes no large workload onto the host computer.

Even when a mechanical trouble such as paper jamming takes place in the page printer, the image printer remains operative in its normal way. When the output data in its entirety remains in the page memory in the page printer device, the output data can be transferred to the image printer. This feature allows the image printer device to print without the need for retransmitting the data from the host computer.

Even when the page printer device is printing one printing data, the image printer device remains capable of printing different printing data if it is image data because it requires no process by the page printer. Thus, both the page printer device and image printer device are substantially concurrently usable.

The prior art Centronics parallel interface allows a single port to service a single type of printer device. According to the printer system of the present invention, a single port is capable of connecting to and servicing two types of printer devices.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

Figure 14:
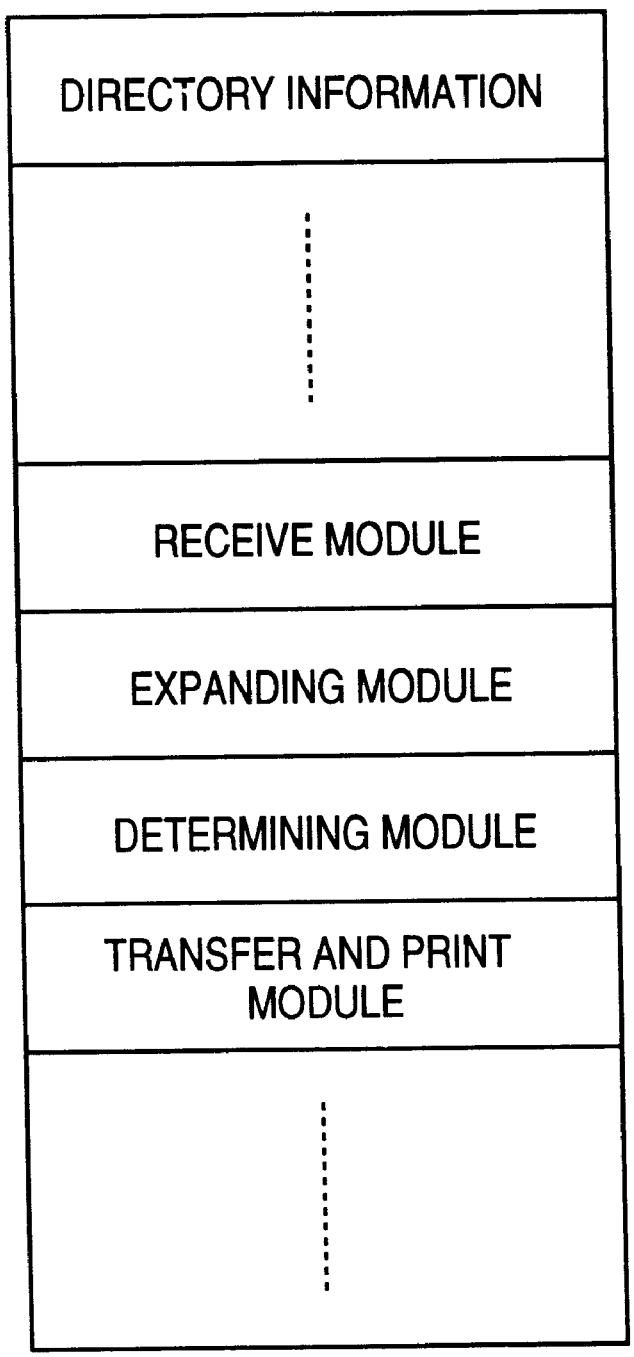
FIG. 14 shows the memory map of the modules stored in a memory medium.

In a case where the present invention is applied to the aforesaid storage medium, the storage medium stores program codes corresponding to the flowcharts described in the embodiments. Briefly, the storage medium stores each module shown as an example of a memory map in FIG. 14. More specifically, program codes which correspond to receive module, expanding module, determining module and transfer and print module, at least, are to be stored in the storage medium.

The present invention may be applied in the existing system of a prior art computer and image printer device by incorporating a newly developed page printer device into the system.

Although the present invention has been described by referring to preferred embodiments thereof, the present invention is not limited to the above embodiments, and it will be understood that a variety of modifications are made without departing from the nature and scope of the invention as set forth in appended claims.

What is claimed is:

1. A printer device comprising:
   receiving means for receiving printing information through a first interface;
   expander means for expanding into expanded image data the printing information received from said receiving means;
   printing means for printing the expanded image data;
   transmitting means for transmitting the expanded image data out of said printer device through a second interface different from the first interface; and
   determining means for determining, based on the printing information received by said receiving means, whether the expanded image data is to be handled in a first mode or in a second mode,
   wherein, in the first mode, the image data expanded by said expander means is printed by said printing means without being transmitted through the second interface, and in the second mode, after the printing information has been expanded into the expanded image data, the image data expanded by said expander means is transmitted by said transmitting means through the second interface without being printed by said printing means.

2. The printer device according to claim 1, wherein said printer device comprises the second interface, said second interface being connected with another printer device.

3. The printer device according to claim 2, wherein said printer device further comprises selecting means for selecting one of the first and second modes based on a status of said printing means and a status of the other printer device.

4. The printer device according to claim 1, wherein said receiving means is capable of receiving a page description language and image data as the printing information.

5. The printer device according to claim 4, wherein the received printing information is only the page description language.

6. A printing method of a first printer device, said method comprising the steps of:
   receiving printing information through a first interface;
   expanding the received printing information into expanded image data;
   printing the expanded image data, when a first mode of the first printer device is selected;
   transmitting the expanded image data out of the first printer device through a second interface different from the first interface; and
   determining, based on the printing information received by said receiving step, whether the expanded image data is to be handled in the first mode or in a second mode,
   wherein, in the first mode, the image data expanded at said expanding step is printed at said printing step without being transmitted through the second interface, and in the second mode, after the printing information has been expanded into the expanded image data, the image data expanded at said expanding step is transmitted at said transmitting step through the second interface without being printed at said printing step.

7. The printing method according to claim 6, wherein the first printer device comprises the second interface, the second interface being connected with another printer device.

8. The printing method according to claim 7, wherein one of the first and the second modes is selected based on a status of the first printing device and a status of the other printer device.

9. The printing method according to claim 6, wherein in said receiving step, a page description language or image data may be received as the printing information.

10. The printing method according to claim 9, wherein the received printing information is only the page description language.

11. A printer system constructed of a computer capable of generating page description language output data including printing data, a page printer device connected to the computer that receives the output data from the computer and is capable of rasterizing the received output data, and an image printer device connected to the page printer device,
   said printer system being provided with a function of causing said computer to add destination data of a target printer device to a header portion of the output data, the destination data being different from and separate from the printing data in the output data, and causing said page printer device to determine, based on the destination data received in the output data, whether to print the output data by the page printer device or transfer image data rasterized based on the output data from said page printer device to said image printer device where the output data is printed out.

12. The printer system according to claim 11, wherein said computer checks a characteristic of the output data, the characteristic being at least one of color and image resolution, adds a check result as a data type to the header portion of the output data to form resulting output data, and transfers the resulting output data to said page printer device, and, based on the data type of the output data, said page printer device determines whether to print the output data on its own or to transfer the resulting output data to said image printer device where the output data is printed out.

13. The printer system according to claim 11, wherein said page printer device determines whether or not the rasterized output data remains in a memory area of said page printer device when a mechanical trouble including at least one of a paper jam and running out of toner or paper occurs in a printing block of said page printer device, said page printer device transferring to the image printer device the rasterized output data if the rasterized output data remains in the memory area.

14. The printer system according to claim 11, wherein when said computer gives new output data during a printing operation of said page printer device, said page printer device stores the new output data into a receive buffer of said page printer device, determines whether the new output data is transferable data or not, and, if transferable data, transfers the new output data from the receive buffer to said image printer device to be printed there.

15. A computer program product for operating a printer device, comprising codes for performing the following steps:

receiving printing information through a first interface;

expanding into expanded image data the printing information received at said receiving step;

printing the expanded image data using printing means;

transmitting the expanded image data out of the printer device through a second interface different from the first interface; and determining, based on the printing information received at said receiving step, whether the expanded image data is to be handled in a first mode or in a second mode, wherein, in the first mode, the image data expanded at said expanding step is printed by the printing means without being transmitted through the second interface, and in the second mode, after the printing information has been expanded into the expanded image data, the image data expanded at said expanding step is transmitted at said transmitting step through the second interface without being printed by the printing means.

\* \* \* \* \*

UNITED STATES PATENT AND TRADEMARK OFFICE
CERTIFICATE OF CORRECTION

PATENT NO. : 5,995,722

DATED : November 30, 1999

INVENTOR(S) : AKIRA KISHIDA

It is certified that error appears in the above-identified patent and that said Letters Patent is hereby corrected as shown below:

COLUMN 1

Line 18, "expands" should read --expand--.

COLUMN 4

Line 31, "goes" should read --goes to--.
   Line 40, "140.0n" should read --140. On--.

COLUMN 7

Line 39, "particular" should read --particularly--.

COLUMN 8

Line 2, "object" should read --objects--; and "is" should read --are--.

COLUMN 9

Line 35, "print" should read --a print--.

UNITED STATES PATENT AND TRADEMARK OFFICE
CERTIFICATE OF CORRECTION

PATENT NO. : 5,995,722

DATED : November 30, 1999

INVENTOR(S) : AKIRA KISHIDA

It is certified that error appears in the above-identified patent and that said Letters Patent is hereby corrected as shown below:

<u>COLUMN 10</u>

Line 60, "Embodiment" should read --Embodiments--.

Signed and Sealed this

Seventh Day of November, 2000

Attest:

Q. TODD DICKINSON

*Attesting Officer*          *Director of Patents and Trademarks*